United States Patent
Perera et al.

(10) Patent No.: US 11,372,650 B2
(45) Date of Patent: Jun. 28, 2022

(54) SYSTEM, APPARATUS, AND METHOD FOR EXCEPTION HANDLING BETWEEN AN AUTOMATED SOFTWARE SYSTEM AND A HUMAN OPERATOR

(71) Applicant: Roots Automation, Inc., New York, NY (US)

(72) Inventors: Charith J Perera, Brooklyn, NY (US); John Cottongim, New York, NY (US)

(*) Notice: Subject to any disclaimer, the term of this patent is extended or adjusted under 35 U.S.C. 154(b) by 0 days.

(21) Appl. No.: 16/734,967

(22) Filed: Jan. 6, 2020

(65) Prior Publication Data

US 2021/0042126 A1 Feb. 11, 2021

Related U.S. Application Data

(60) Provisional application No. 62/811,910, filed on Feb. 28, 2019.

(51) Int. Cl.
| | |
|---|---|
| *G06F 9/38* | (2018.01) |
| *G06F 9/451* | (2018.01) |
| *G06F 9/46* | (2006.01) |
| *G06F 16/18* | (2019.01) |
| *G06F 11/07* | (2006.01) |
| *G06F 11/30* | (2006.01) |
| *G06F 11/32* | (2006.01) |

(52) U.S. Cl.
CPC ............ *G06F 9/3861* (2013.01); *G06F 9/451* (2018.02); *G06F 9/461* (2013.01); *G06F 11/0772* (2013.01); *G06F 11/0793* (2013.01); *G06F 11/302* (2013.01); *G06F 11/327* (2013.01); *G06F 16/1865* (2019.01)

(58) Field of Classification Search
CPC ........ G06F 9/3861; G06F 9/451; G06F 9/461; G06F 16/1865; G06F 11/0772; G06F 11/302; G06F 11/327; G06F 11/0793; G06F 2209/481; G06F 9/4812
See application file for complete search history.

(56) References Cited

U.S. PATENT DOCUMENTS

| | | | | |
|---|---|---|---|---|
| 5,963,952 | A * | 10/1999 | Smith | G06F 40/123 |
| 6,189,785 | B1 * | 2/2001 | Lowery | G06Q 20/04 |
| | | | | 235/379 |
| 7,673,302 | B1 * | 3/2010 | Katzer | G06F 9/5038 |
| | | | | 718/101 |

(Continued)

FOREIGN PATENT DOCUMENTS

WO WO-2019013510 A1 * 1/2019 ......... G06F 16/3331

*Primary Examiner* — Farley Abad
(74) *Attorney, Agent, or Firm* — Kristin Grant; Grant Attorneys at Law PLLC

(57) ABSTRACT

A system, method, apparatus, and computer program product for exception handling between a robotic process automation system and a human operator where the exception is conveyed to the human via a messaging service. The exception is processed by a form algorithm which presents a graphical user interface via a dynamic web form that elicits human input of missing data elements. In cooperation with a validation algorithm, the dynamic web form ensures all missing data elements are provided by the human operator in the desired format. The dynamic web form allows a human to submit the requisite missing data elements, clear entered data elements, and mark the exception for offline processing.

20 Claims, 8 Drawing Sheets

(56) References Cited

U.S. PATENT DOCUMENTS

| | | | | |
|---|---|---|---|---|
| 9,110,803 | B2* | 8/2015 | Archer | G06F 11/0793 |
| 10,423,948 | B1* | 9/2019 | Wilson | G06Q 20/3255 |
| 2003/0018681 | A1* | 1/2003 | Subramanian | G06F 9/3861 |
| | | | | 718/102 |
| 2006/0112373 | A1* | 5/2006 | Rokosz | G06F 11/3664 |
| | | | | 717/125 |
| 2007/0143485 | A1* | 6/2007 | Da Palma | G06Q 10/10 |
| | | | | 709/227 |
| 2009/0288101 | A1* | 11/2009 | Gandin | G06Q 10/00 |
| | | | | 719/314 |
| 2015/0195348 | A1* | 7/2015 | Jelle | G06Q 10/06 |
| | | | | 709/201 |

* cited by examiner

FIG. 4

ABC Corporation

Referral Handling

[Referral Details]

Exception Form

Need Help?    Revisions

Please update highlighted items:

| Field | Value |
|---|---|
| Vendor Name | ROOMBEE LLC |
| Invoice Number | 602624283 |
| Email | sakusha@me.com |
| Total Due | 34607 |
| Vendor Zip | 90210 |

Add comments

Found the correct zip code and provided it to the robot

Add 1 to 2 of 2

| Logged Time | Description | Logged By |
|---|---|---|
| 6/17/2019, 10:36 PM | Item updated. | |
| 6/17/2019, 10:23 PM | Item created. | |

Save   Reprocess   Close Manually   Cancel

MORE VIDEOS

SYSTEM, APPARATUS, AND METHOD FOR EXCEPTION HANDLING BETWEEN AN AUTOMATED SOFTWARE SYSTEM AND A HUMAN OPERATOR

CROSS REFERENCE TO RELATED APPLICATIONS

This application claims the benefit of U.S. Provisional Patent Application No. 62/822,910 filed Feb. 28, 2019, which is incorporated by reference herein in its entirety.

BACKGROUND

Field of the Invention

The present invention relates to process automation, and more particularly to exception handling during the execution of automated robotic processes.

Related Art

Robotic process automation involves the use of software or "bots" to automate tasks which are rule-based and repetitive, such as various industrial and clerical processes. Robotic process automation is used to eliminate the need for a human to conduct time-consuming, repetitive, and tedious tasks.

During the execution of an automated business task, a robotic process automation system may encounter events which cannot be handled based on the system's instructions. These are called exceptions. Currently in the art, when an exception occurs a robotic process automation system would stop processing the task and hand it off to a human to complete or where possible, flag the exception for review by a human while continuing the task. This can lead to delays, particularly where the human may be unfamiliar with the exception and one or more data inputs that may be necessary to clear the exception and resume the process.

There is a need for an improved system, apparatus, and method to provide a robotic process automation system with the ability to interact with a human either in real time or asynchronously via a graphical user interface, to receive and interpret additional instructions on how best to handle the exception and then proceed to complete the task.

SUMMARY OF THE INVENTION

It is to be understood that the phraseology and terminology employed herein are for the purpose of the description and should not be regarded as limiting.

The present invention is directed to a system, apparatus, and method for exception handling comprising a first computing device on which there is a robotic process automation system. A memory storing instructions and a database storing a plurality of prior transactions. Further, there is a hardware processor coupled to the memory wherein the hardware processor is configured by the instructions to: monitor the automated business task, detect an exception during the processing of the automated business task, temporarily halt processing, search the database to locate matching exceptions which occurred during previous executions of the same task, identify one or more solutions to resolve the exception, and execute at least one solution of the one or more of the solutions to resolve the exception.

These and other aspects of the present invention will become readily apparent upon further review of the specification and drawings.

BRIEF DESCRIPTION OF THE DRAWINGS

Embodiments of the present invention will be described by way of example only, and not limitation, with reference to the accompanying drawings.

FIGS. 4-6 illustrate an example graphical user interface where the present invention is implemented in an automated accounts payable system according to an embodiment of the present invention.

DETAILED DESCRIPTION

Figure 1:
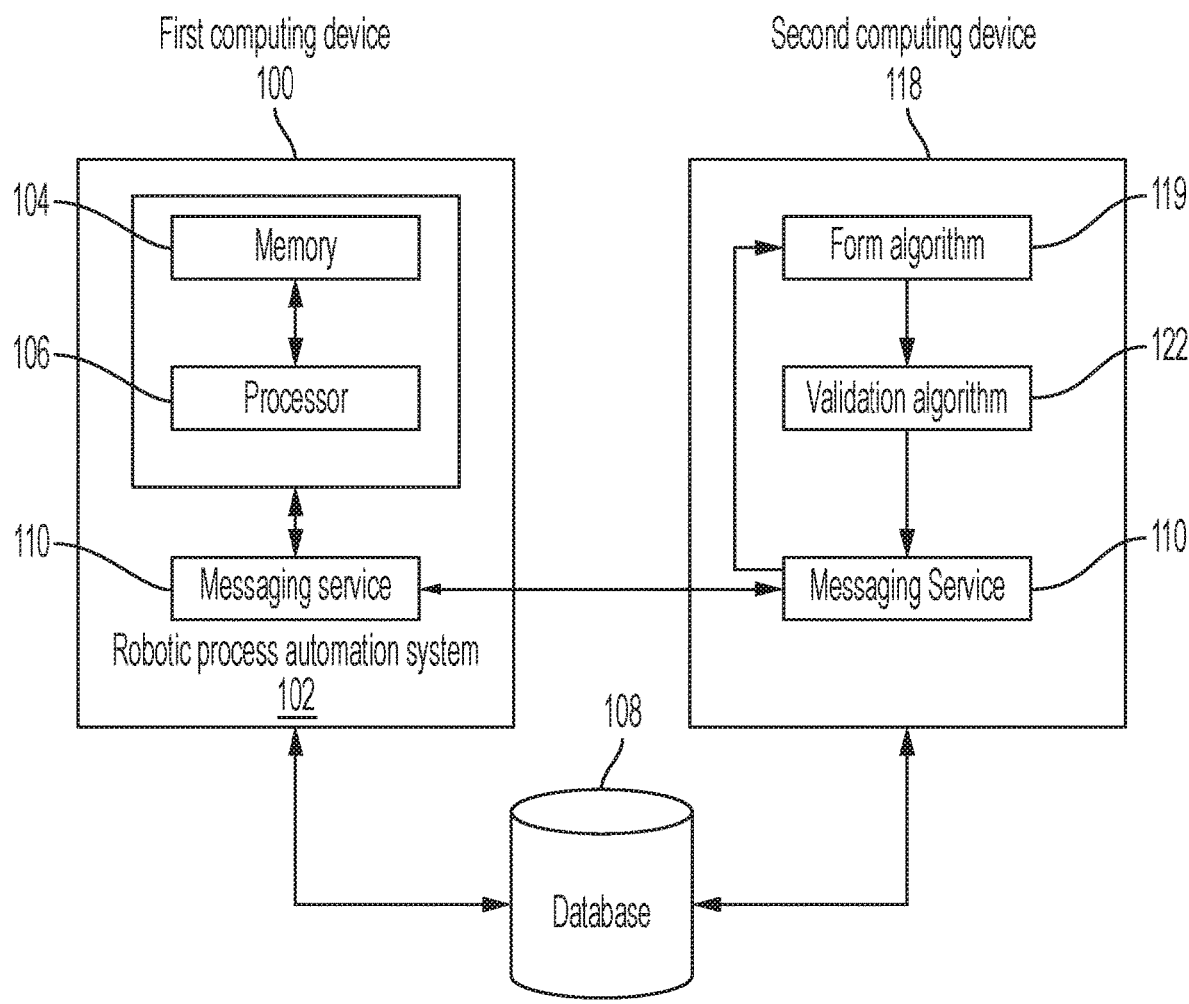
FIG. 1 is a block diagram of an exemplary system, apparatus and method for exception handling according to an embodiment of the present invention.
Figure 2:
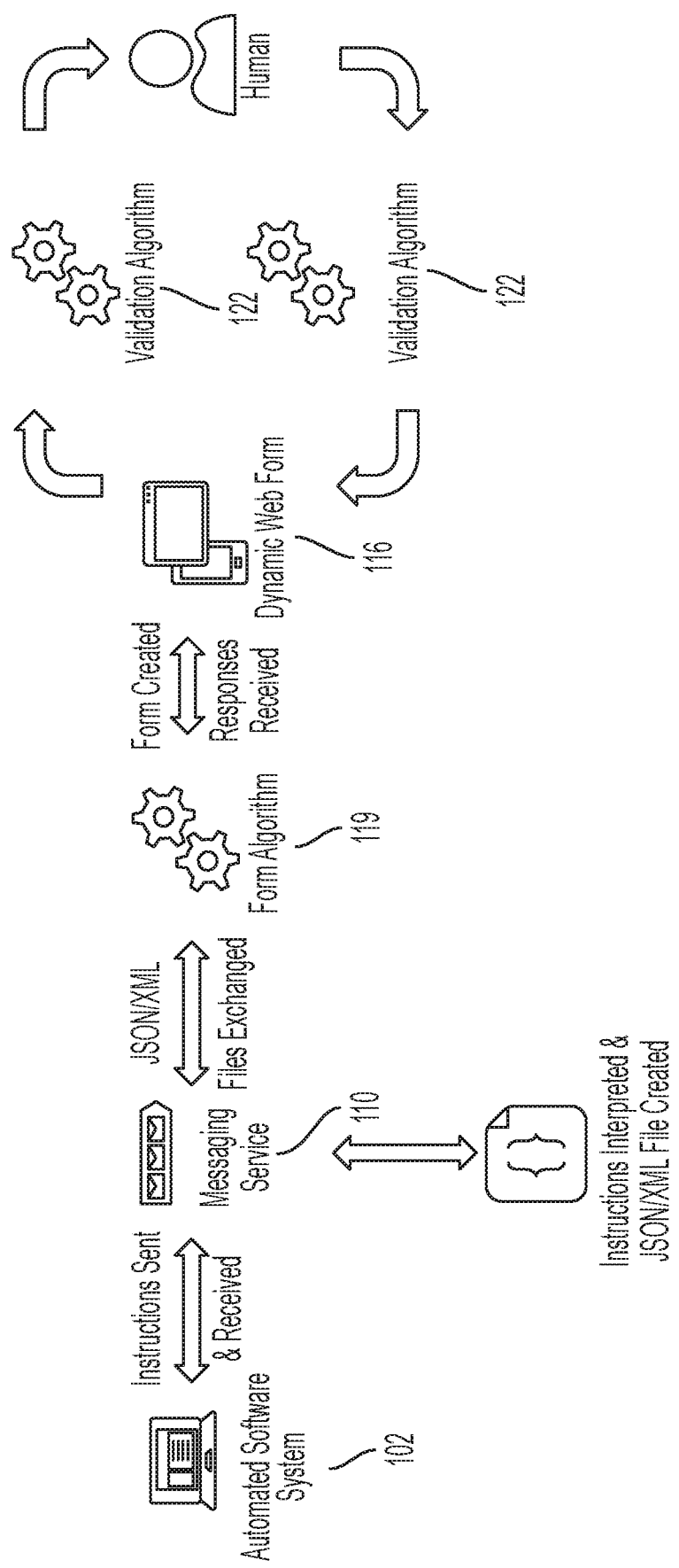
FIG. 2 is an architectural view of an exemplary system, apparatus and method for exception handling according to an embodiment of the present invention.
Figure 3:
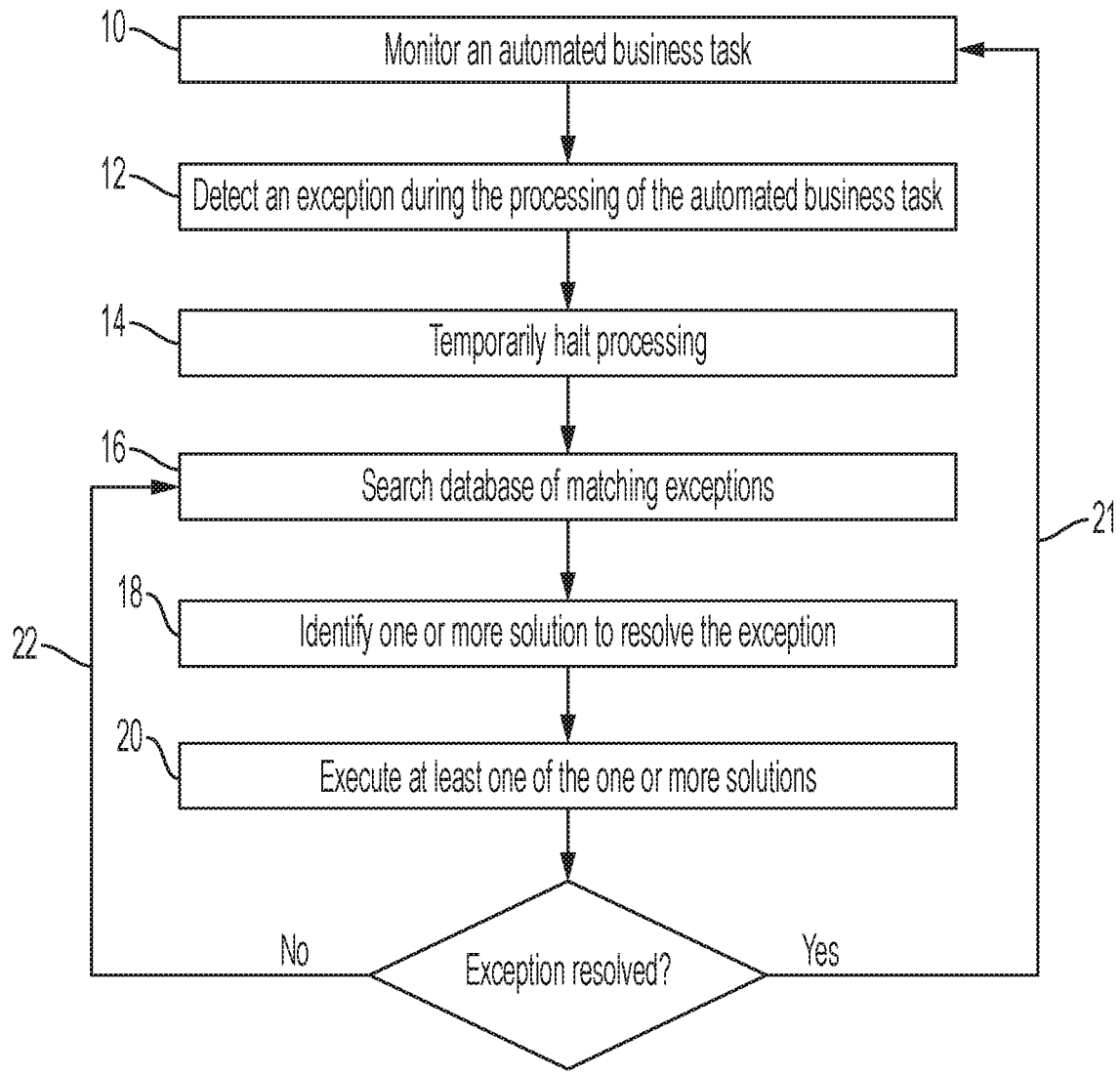
FIG. 3 is a flow diagram illustrating an example process for exception handling according to an embodiment of the present invention.
Figure 4:
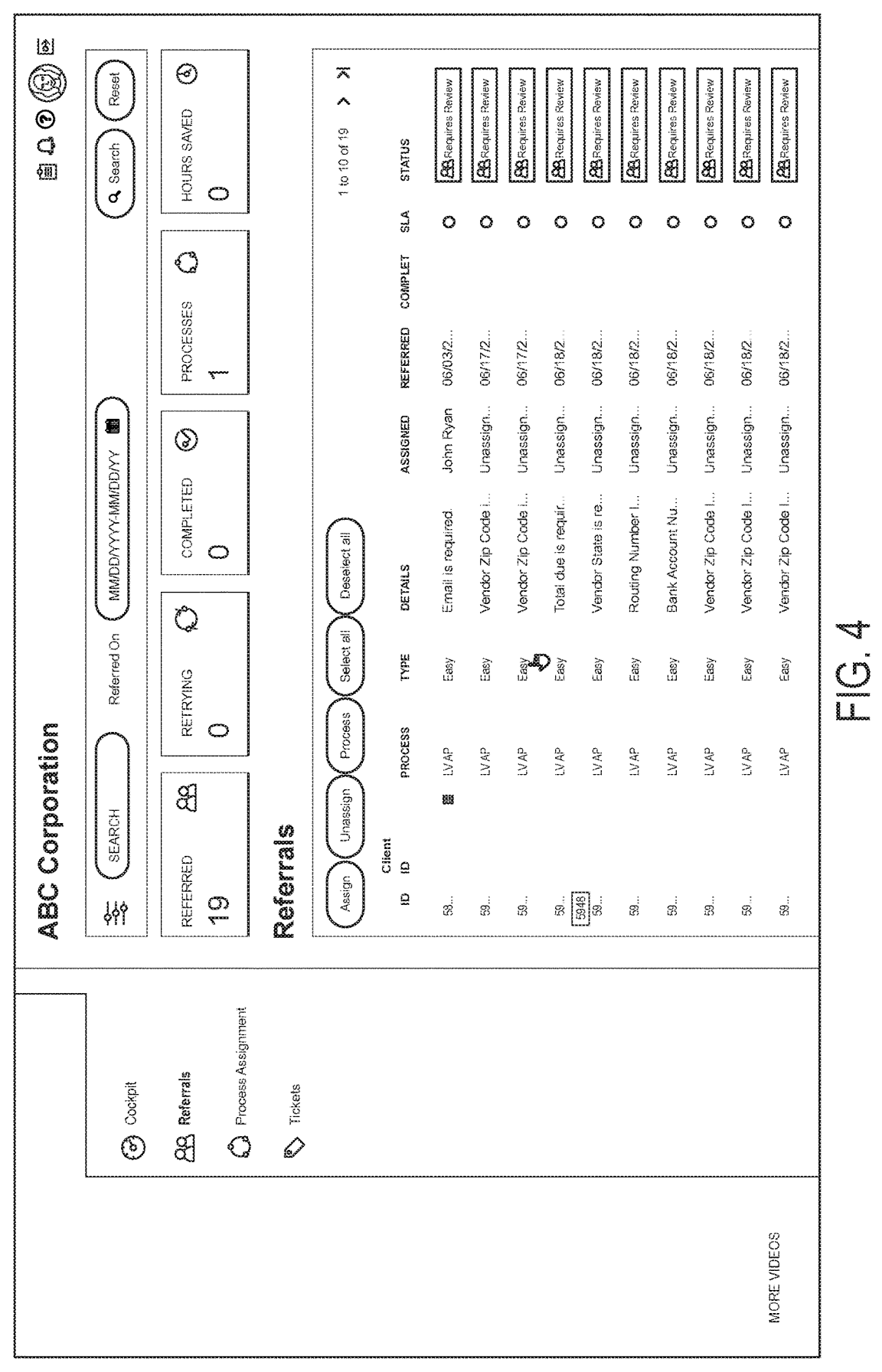
Figure 6:
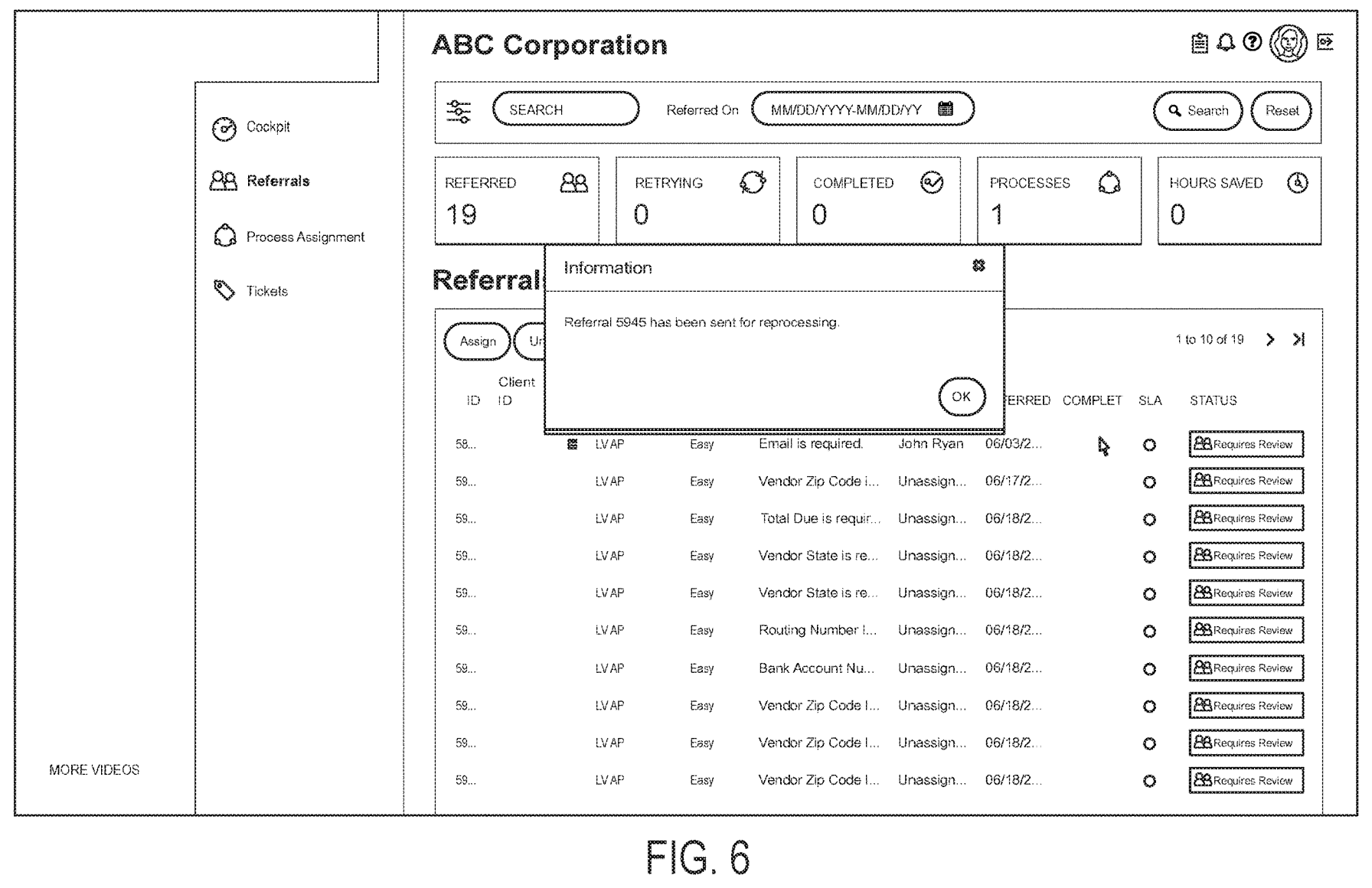
Figure 7A:
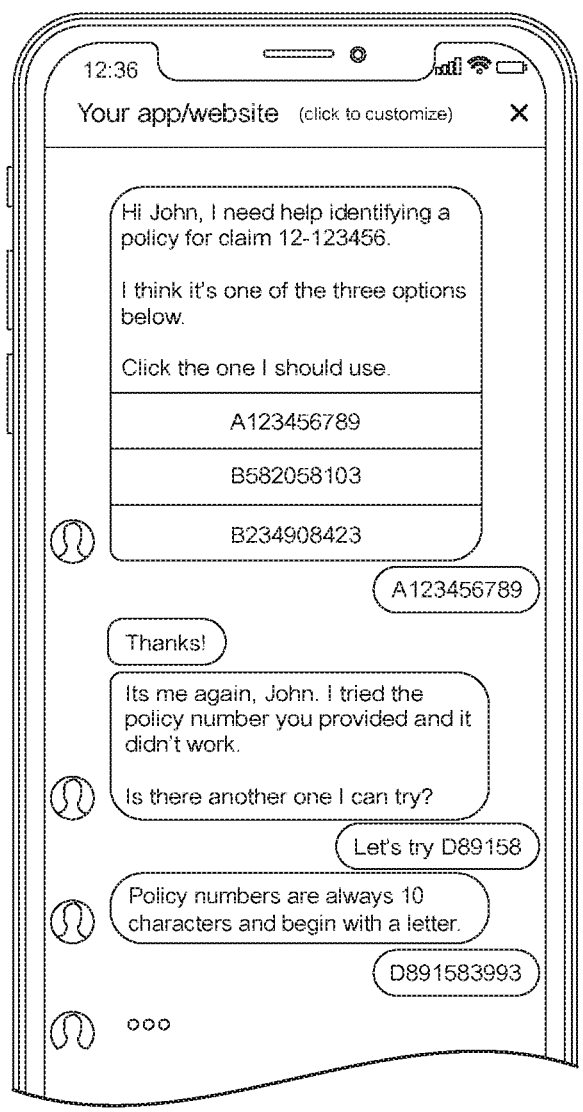
FIGS. 7A-7B illustrate an example text chat interface where a chatbot is used according to an embodiment of the present invention.
Figure 7B:
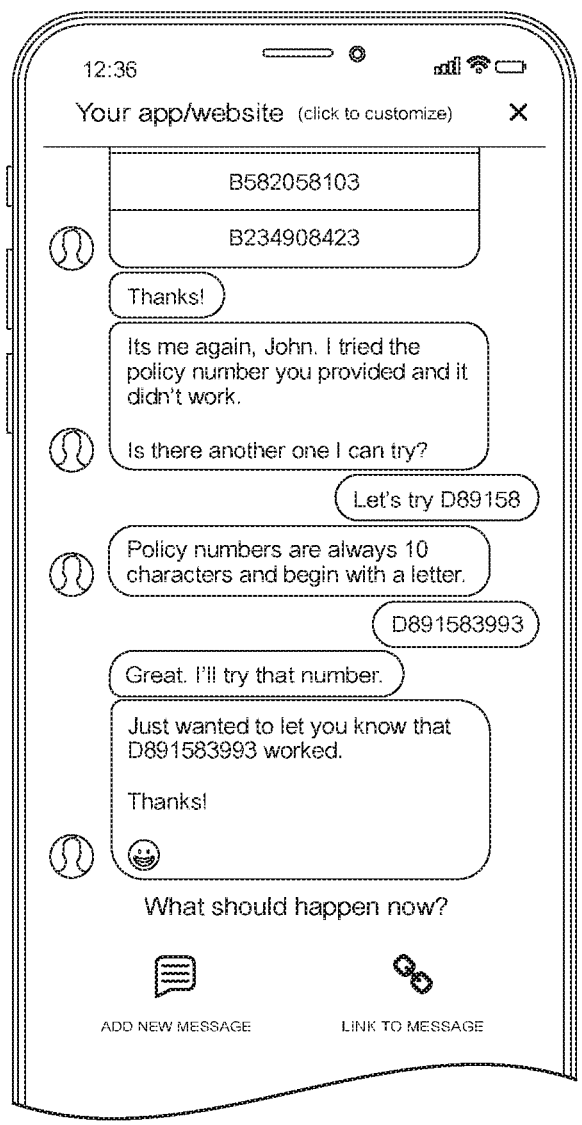

Referring now to the figures where similar reference characters denote similar elements throughout the figures, FIGS. 1 through 7 show preferred embodiments of the present invention described in the context of the following exemplary system, apparatus and method. Specifically, FIGS. 1 through 7 illustrate a system, apparatus, and method for exception handling comprising a first computing device 100 on which there is a robotic process automation system 102, a memory storing instructions 104, and a hardware processor 106 coupled to the memory 104 wherein the hardware processor 106 is configured by the instructions to monitor 10 an automated business task being executed by the robotic process automation system 102, detect 12 an exception during the processing of the automated business task, temporarily halt 14 the processing of the automated business task, search 16 one or more databases 108 each containing a plurality of prior transactions to determine whether the same exception has been encountered during the processing of the same task in the past and how that exception was previously resolved, identify 18 one or more solutions to resolve the exception, and execute 20 at least one solution of the one or more of the solutions to resolve the exception. In embodiments of the present invention the one or more databases 108 may be distributed databases or replicated databases.

In embodiments of the present invention, one of the one or more solutions to resolve the exception involves the system resolving the exception on its own. In this scenario, the robotic process automation system 102 searches the one or more databases 108 and locates any matching exceptions which occurred during previous executions of the same task. If any of these marching exceptions were resolved, the robotic process automation system 102 uses the data used to resolve these matching exceptions, to resolve the present exception and continue execution of the automated business task.

In embodiments of the present invention, one of the one or more solutions to resolve the exception involves the robotic process automation system 102 receiving input from a human in order to resolve the exception and complete the processing of the automated business task. The robotic process automation system 102 may either request an input from the human or provide the human with input options based on the information obtained from the matching exceptions that are located. The robotic process automation system 102 may prompt the human for input through electronic mail, text message to a cellular device or within a desktop or mobile application operating on the human's computing device 118.

Where certain input successfully resolves an exception, that input is stored in the one or more databases 108 for possible use by the robotic process automation system 102 in attempting to resolve future matching exceptions on its own or to provide input options to the human. A machine learning algorithm increases the degree of confidence in using certain data by learning, over the processing of multiple business tasks, which data successfully resolves a certain exception and which data fails to resolve a certain exception. The robotic process automation system 102 only uses the data relevant to an exception where that data produced a successful result for a matching exception multiple times.

The present invention may be understood by way of the following non-limiting examples of the invention in operation. Typically, an automated process is able to handle 80% of all tasks without encountering an exception. Two common types of exceptions are bad input exceptions and system failure exceptions. A bad input exception occurs when the system encounters an event that does not fit within its defined limits, for example where an accounts payable system is instructed to only pay invoices which are $2,000 or less but encounters an invoice for $2,500. Payment of the $2,500 invoice is not within the system's instructions. A system failure exception occurs when the software, website or application that the robotic process automation system is interacting with fails. This failure could be due to unusually long latency, a bug, hardware failure, or some other unforeseen glitch.

In a first example, a bad input exception is encountered where four items of data required to complete a task are not made available to the robotic process automation system 102. When the robotic process automation system 102 encounters a bad input exception it temporarily stops processing the automated business task and sends information about the exception to a messaging service 110. The messaging service 110 provides an interface between the human and/or other computer systems and the robotic process automation system 102. The information is sent by the messaging service 110 to a human's computing device 118 in any common computer file format. This may include JSON, XML or any common computer file format known to one skilled in the art. For the purposes of this example only we will refer to the JSON or XML file format. A form algorithm 119, using a predefined information structure, interprets the information from the messaging service 110 and creates a dynamic web form 116 that displays the information on the human's computing device 118.

A human is prompted and accesses the dynamic web form 116 via a graphical user interlace 120 on their computing device 118 and is further prompted to either enter an input into the dynamic web form 116 or select from input options made available by the robotic process automation system 102. The human may also optionally indicate that the task will be completed manually. The human's computing device 118 may include any computer including, but not limited to, a desktop, laptop, and smart device, such as, a tablet and smart phone.

The dynamic web form 116 provides a human with reference data about the task. Reference data may include a task ID, the date the task was created, or a description of the problem that triggered the exception. For each piece of reference data, the robotic process automation system 102 provides the following instructions in a JSON or XML format: a unique ID for the task; a unique ID for the exception; a unique ID for each message; a name for the reference data which may either be the exception type or the date the exception was created; a string to be presented to the human (e.g. "Business Exception Triggered" or "01/01/2018").

For each piece of missing data the robotic process automation system 102 provides the following instructions in a JSON or XML format: a name of the missing item of data; a data type of the missing item of data (e.g. string, date, time, integer, double, Boolean, image, video, audio); an input type that should be used to capture the missing data (e.g. input box, date picker, drop-down box, radio buttons); a set of choices that should be made available for selection when a drop-down box or a set of radio buttons should be used; a range of acceptable responses when a date, time, or numerical value is being requested; a business rule title that a validation algorithm 122 will use to evaluate a response for its validity once entered into the appropriate field of the dynamic web form 116. The business rule title may be a number or a string that represents a business rule or set of rules that the validation algorithm 122 should reference when evaluating a response within the dynamic web form 116. Further, an input mask is applied to input boxes and date pickers based on the range of acceptable responses as well as the business rule title.

The dynamic web form 116 remains in an input mode until all data entry fields have an input and all data selection fields must have a choice selected. When the human has entered one or more data elements, the dynamic web form 116 may provide for a button to appear to allow the human to reset the dynamic web form and clear the entries. When the human has entered an input for all of the requested data entry fields, the dynamic web form 116 presents a button to allow the human to submit the newly entered data for further validation and processing. The dynamic web form 116 may also present a button that when selected allows the human to close the dynamic web form 116 without submitting any data for further validation and processing.

When information is entered into the dynamic web form 116, the validation algorithm 122 dynamically checks the validity of each entry and only permits the human to submit the completed form if all entries comply with the business rules provided to the messaging service 110. Information relating to the type and range of data required is included in the information packet sent by the messaging service 110. When the data being input does not conform to the range of acceptable responses or the corresponding business rules for the business rule title, the validation algorithm 122 informs the human that a further update to the missing data is necessary and where possible what the problem with the existing missing data was, for example, a phone number that only has 6 digits instead of 7 or 10 as required by the business rules.

Once all data entries are compliant, the human may press a button that saves the data and the messaging service 110 sends the new information in a JSON or XML format back to the robotic process automation system 102. The JSON or XML file that the messaging service 110 sends back to the robotic process automation system 102 includes the unique ID for this task, the unique ID for this exception, and the unique ID for this message. For each piece of dynamic web form 116 data that the human either entered or selected, the JSON or XML file includes the name of the data element and the responses that the human provided through the dynamic web form 116.

The robotic process automation system 102 then resumes operation and attempts to process the automated business task again using the data elements that the human provided. If successful 21, the robotic process automation system 102 informs the messaging service 110 that the exception is resolved and the task is complete.

If the robotic process automation system 102 is unable to resolve 22 the exception and complete the task based on the input elements, the robotic process automation system 102 repeats the steps described above until the task can be successfully processed or a human intervenes telling the robotic process automation system 102 that it will handle the exception manually. When the human makes the choice to handle an exception manually, the robotic process automation system 102 may mark the task as "completed offline", or a similar marking. The present invention is a multitenant system wherein a human user has the flexibility to determine at what stage manual intervention is necessary.

In some embodiments of the present invention, the robotic process automation system 102 requests input from a human by way of a chatbot instead of the dynamic webform 116. A chatbot algorithm interprets the information from the messaging service, builds a dialogue from dialogue stored in a dialogue database, and communicates with the human verbally or via a text chat interface on the human's computing device 118.

In a second example, a system exception is encountered. In this scenario, the robotic process automation system 102 captures its actions immediately prior to the occurrence of the exception as well as data about the state of the software, website or application, and the state of the computer on which the robotic process automation system 102 was running (e.g., CPU usage, RAM usage, screen resolution, other applications that were running, etc.). This information is sent to the messaging service 110 in any common computer file format. This may include JSON, XML or any common computer file format known to one skilled in the art. For the purposes of this example only we will refer to the JSON or XML file format. A form algorithm 119, using a predefined information structure, interprets the information from the messaging service 110 and creates a dynamic web form 116 that displays the information on the human's computing device 118. A human is prompted and access the dynamic web form 116 via a graphical user interface 120 on their computing device 118.

The robotic process automation system 102 may attempt the transaction again to see if the exception was a temporary glitch. If it does encounter the problem again it will again send a message to a human via the messaging service 110. The data from system exceptions is used to identify possible improvements to the robotic process automation system 102.

The present invention includes software which may either be loaded onto a computer or accessed by a computer. The loaded software may include an application on a smart device. A computer may access the software via the web browser using the internet, extranet, intranet, host server, internet cloud and the like.

The system and method described herein is for purposes of example only, and may be implemented in any type of computer system or programming or processing environment, or in a computer program, alone or in conjunction with hardware. The present invention may also be implemented in software stored on a non-transitory computer-readable medium and executed as a computer program on a general purpose or special purpose computer. For clarity, only those aspects of the system germane to the invention are described, and product details well known in the art are omitted. For the same reason, the computer hardware is not described in further detail.

It should thus be understood that the invention is not limited to any specific computer language, program, or computer. It is further contemplated that the present invention may be run on a stand-alone computer system, or may be run from a server computer system that can be accessed by a plurality of client computer systems interconnected over an intranet network, or that is accessible to clients over the Internet. In addition, many embodiments of the present invention have application to a wide range of industries.

To the extent the present invention discloses a system, the method implemented by that system, as well as software stored on a computer-readable medium and executed as a computer program to perform the method on a general purpose or special purpose computer, are within the scope of the present invention. Further, to the extent the present application discloses a method, a system of apparatuses configured to implement the method are within the scope of the present invention. It should be understood, of course, that the foregoing relates to exemplary embodiments of the invention and that modifications may be made without departing from the spirit and scope of the invention.

What is claimed is:

1. A system for exception handling during the processing of an automated business task by a robotic process automation system, comprising:
   a. one or more databases each storing a plurality of prior transactions; and
   b. a first computing device comprising:
      i) a memory storing instructions; and
      ii) a hardware processor coupled to the memory wherein the hardware processor is configured by the instructions to:
         a) monitor an automated business task;
         b) detect an exception during the processing of the automated business task;
         c) halt, temporarily, the processing of the automated business task;
         d) search the one or more databases to locate matching exceptions, wherein matching exceptions are identical exceptions which occurred during previous executions of the same automated business task;
         e) identify one or more solutions to resolve the exception, wherein at least one solution of the one or more solutions comprises providing, via a messaging service, information to a chatbot algorithm said chatbot algorithm using said information to build a dialogue from dialogue stored in a dialogue database; and prompting a user to access the chatbot via a user interface on a second computing device; and
         f) execute at least one solution of the one or more of the solutions to resolve the exception.

2. The system of claim 1, wherein at least a second solution of the one or more solutions comprises using data used to successfully resolve prior matching exceptions, to resolve the exception and complete the task.

3. The system of claim 1, wherein at least a second solution of the one or more solutions comprises the method of providing a user with one or more input options, said method comprising: providing, via a messaging service, information to a form algorithm said form algorithm using said information to build a dynamic web form, the dynamic web form capable of being different each time it is built; prompting a user to access the dynamic web form via a graphical user interface on a second computing device receiving input from a user wherein the user input is one or more selections from options displayed on the graphical user interface; using a validation algorithm, dynamically validating the user input by referencing a business rule title; and transmitting, by the messaging service, the validated user input to the robotic process automation system.

4. The system of claim 1, wherein the at least one solution of the one or more solutions further comprises receiving input from a user wherein the user input is one or more selections from options presented through the user interface; using a validation algorithm, dynamically validating the user input by referencing a business rule title; and transmitting, by the messaging service, the validated user input to the robotic process automation system.

5. The system of claim 1, wherein at least a second solution of the one or more solutions comprises the method of receiving input from a user, said method comprising: providing, via a messaging service, information to a form algorithm said form algorithm using said information to build a dynamic web form, the dynamic web form capable of being different each time it is built; prompting a user to access the dynamic web form via a graphical user interface on a second computing device; receiving input from a user; using a validation algorithm, dynamically validating the user input by referencing a business rule title; and transmitting, by the messaging service, the validated user input to the robotic process automation system.

6. The system of claim 1, wherein the at least one solution of the one or more solutions further comprises receiving input from a user; using a validation algorithm, dynamically validating the user input by referencing a business rule title; and transmitting, by the messaging service, the validated user input to the robotic process automation system.

7. A system for exception handling during the processing of an automated business task, comprising:
   a. one or more databases each storing a plurality of prior transactions; and
   b. a robotic process automation system operating on a first computing device, the first computing device, comprising:
      i) a memory storing instructions; and
      ii) a hardware processor coupled to the memory wherein the hardware processor is configured by the instructions to:
         a) monitor the automated business task;
         b) detect an exception during the processing of the automated business task;
         c) halt, temporarily, the processing of the automated business task;
         d) search the database to locate matching exceptions, wherein matching exceptions are identical exceptions which occurred during previous executions of the same automated business task;
         e) identify one or more solutions to resolve the exception, wherein at least one solution of the one or more solutions comprises providing, via a messaging service, information to a chatbot algorithm said chatbot algorithm using said information to build a dialogue from dialogue stored in a dialogue database; and prompting a user to access the chatbot via a user interface on a second computing device; and
         f) execute at least one solution of the one or more of the solutions to resolve the exception.

8. The system of claim 7, wherein at least a second solution of the one or more solutions comprises using data used to successfully resolve prior matching exceptions, to resolve the exception and complete the task.

9. The system of claim 7, wherein at least a second solution of the one or more solutions comprises the method of providing a user with one or more input options, said method comprising: providing, via a messaging service, information to a form algorithm said form algorithm using said information to build a dynamic web form, the dynamic web form capable of being different each time it is built; prompting a user to access the dynamic web form via a graphical user interface on a second computing device; receiving input from a user wherein the user input is one or more selections from options displayed on the graphical user interface; using a validation algorithm, dynamically validating the user input by referencing a business rule title; and transmitting, by the messaging service, the validated user input to the robotic process automation system.

10. The system of claim 7, wherein the at least one solution of the one or more solutions further comprises receiving input from a user wherein the user input is one or more selections from options presented through the user interface; using a validation algorithm, dynamically validating the user input by referencing a business rule title; and transmitting, by the messaging service, the validated user input to the robotic process automation system.

11. The system of claim 7, wherein at least a second solution of the one or more solutions comprises the method of receiving input from a user, said method comprising: providing, via a messaging service, information to a form algorithm said form algorithm using said information to build a dynamic web form, the dynamic web form capable of being different each time it is built; prompting a user to access the dynamic web form via a graphical user interface on a second computing device; receiving input from a user, using a validation algorithm, dynamically validating the user input by referencing a business rule title; and transmitting, by the messaging service, the validated user input to the robotic process automation system.

12. The system of claim 7, wherein the at least one solution of the one or more solutions further comprises receiving input from a user; using a validation algorithm, dynamically validating the user input by referencing a business rule title; and transmitting, by the messaging service, the validated user input to the robotic process automation system.

13. A computer-implemented method for exception handling during the processing of an automated business task by a robotic process automation system, comprising:
   a) monitoring the automated business task;
   b) detecting an exception during the processing of the automated business task;
   c) halting, temporarily, the processing of the automated business task;
   d) searching one or more databases each storing a plurality of transactions, to locate matching exceptions, wherein matching exceptions are identical exceptions which occurred during previous executions of the same automated business task;

e) identifying one or more solutions to resolve the exception, wherein at least one solution of the one or more solutions comprises providing, via a messaging service, information to a chatbot algorithm said chatbot algorithm using said information to build a dialogue from dialogue stored in a dialogue database; and prompting a user to access the chatbot via a user interface on a second computing device; and f) executing at least one solution of the one or more of the solutions to resolve the exception.

14. The computer-implemented method of claim 13, wherein at least a second solution of the one or more solutions comprises using data used to successfully resolve prior matching exceptions, to resolve the exception and complete the task.

15. The computer-implemented method of claim 13, wherein at least a second solution of the one or more solutions comprises the method of providing a user with one or more input options, said method comprising: providing, via a messaging service, information to a form algorithm said form algorithm using said information to build a dynamic web form, the dynamic web form capable of being different each time it is built; prompting a user to access the dynamic web form via a graphical user interface on a second computing device; receiving input from a user wherein the user input is one or more selections from options displayed on the graphical user interface; using a validation algorithm, dynamically validating the user input by referencing a business rule title; and transmitting, by the messaging service, the validated user input to the robotic process automation system.

16. The computer-implemented method of claim 13, wherein the at least one solution of the one or more solutions comprises further receiving input from a user wherein the user input is one or more selections from options presented through the user interface; using a validation algorithm, dynamically validating the user input by referencing a business rule title; and transmitting, by the messaging service, the validated user input to the robotic process automation system.

17. The computer-implemented method of claim 13, wherein at least a second solution of the one or more solutions comprises the method of requesting input from a user, said method comprising: providing, via a messaging service, instructions to a form algorithm said form algorithm using said instructions to build a dynamic web form, the dynamic web form capable of being different each time it is built; prompting a user to access the dynamic web form via a user interface on a second computing device; receiving input from a user; using a validation algorithm, dynamically validating the user input by referencing a business rule title; transmitting the validated user input to the messaging system which transmits the validated user input to the automated software system.

18. The computer-implemented method of claim 13, wherein the at least one solution of the one or more solutions further comprises receiving input from a user; using a validation algorithm, dynamically validating the user input by referencing a business rule title; and transmitting, by the messaging service, the validated user input to the robotic process automation system.

19. The method of claim 13, wherein the detected exception is a system exception, the method further comprising the robotic process automation system capturing its actions immediately prior to the occurrence of the exception.

20. The method of claim 13, wherein the detected exception is a system exception, the method further comprising after temporarily halting the processing of the automated business task, commencing the processing of the automated business task again to determine if the same exception is detected.

* * * * *